(12) United States Patent
Girardey

(10) Patent No.: US 6,200,036 B1
(45) Date of Patent: Mar. 13, 2001

(54) TAKE-UP FRAME SYSTEM AND METHOD WITH FORCE FEEDBACK

(75) Inventor: Greg F. Girardey, Greer, SC (US)

(73) Assignee: Reliance Electric Technologies, LLC, Thousand Oaks, CA (US)

( * ) Notice: Subject to any disclaimer, the term of this patent is extended or adjusted under 35 U.S.C. 154(b) by 0 days.

(21) Appl. No.: 09/406,365

(22) Filed: Sep. 28, 1999

(51) Int. Cl.[7] ........................................ F16C 23/00
(52) U.S. Cl. ............................... 384/260; 474/136
(58) Field of Search .................... 384/247, 252, 384/253, 256, 257, 258, 259, 260; 474/102, 136

(56) References Cited

U.S. PATENT DOCUMENTS

| | | | |
|---|---|---|---|
| 4,325,588 | * 4/1982 | Elliott, Jr. et al. | 384/247 |
| 4,676,670 | * 6/1987 | Nisley | 384/247 |
| 5,030,173 | * 7/1991 | Bryant | 474/136 |
| 5,518,457 | * 5/1996 | Seki et al. | 474/102 |
| 5,749,659 | * 5/1998 | Nisley | 384/260 |

* cited by examiner

*Primary Examiner*—Thomas R. Hannon
(74) *Attorney, Agent, or Firm*—Patrick S. Yoder; John H. Horn; A. M. Gerasimow

(57) ABSTRACT

A take-up frame assembly is instrumented with a sensor for detecting tensile or compressive loading on the assembly during adjustment. A visual readout of the loading is provided as feedback to an operator in making system adjustments. The readout may be resident at the take-up frame, or part of a portable module coupled to the sensor during adjustment. In systems including a pair of take-up frames on either side of a machine, such as a pulley-driven belt conveyor, the sensor and feedback arrangement can be used to balance forces on both sides of the system to achieve the desired operational belt tension.

20 Claims, 3 Drawing Sheets

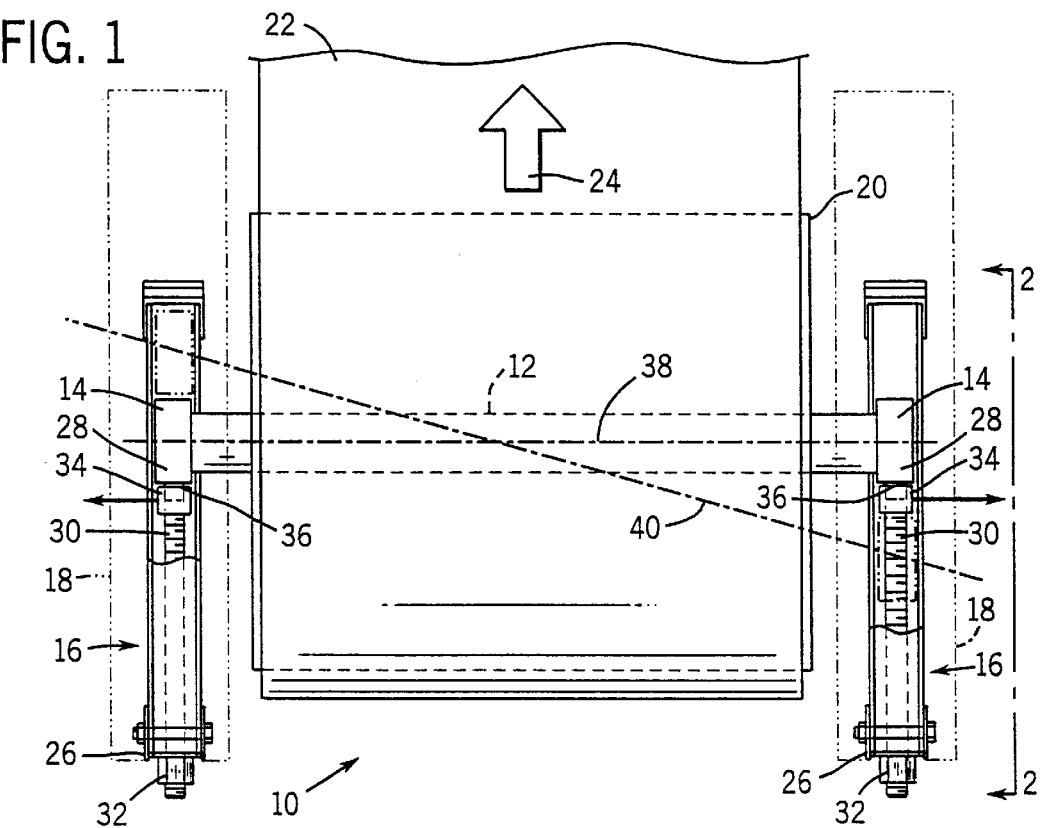
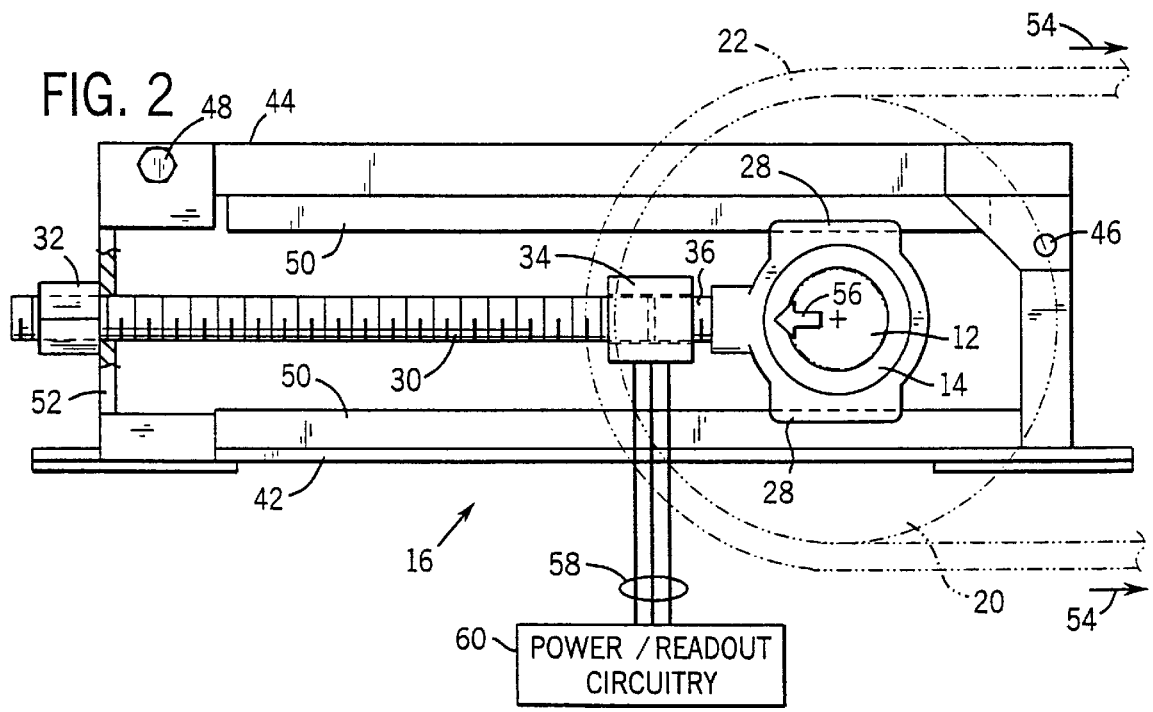

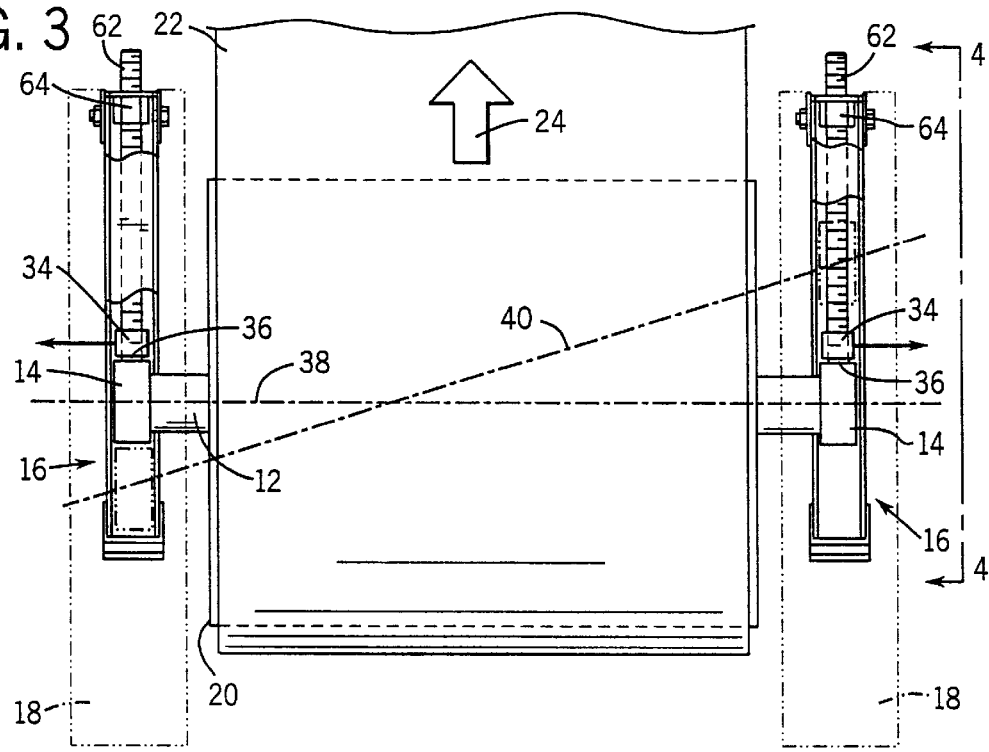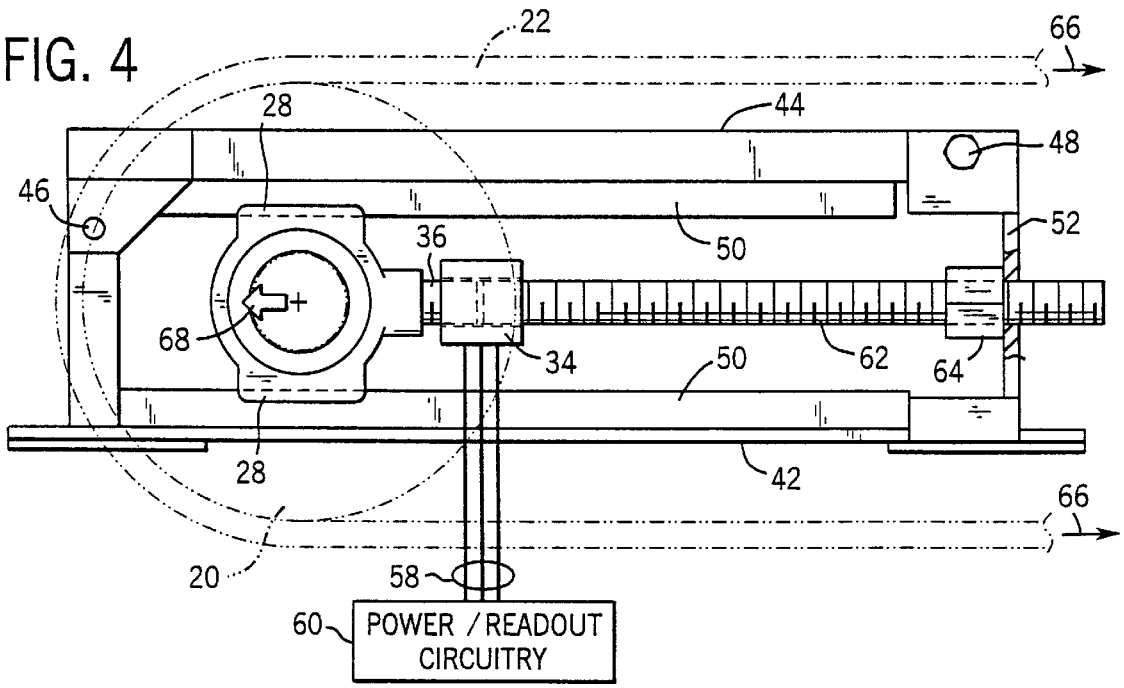

TAKE-UP FRAME SYSTEM AND METHOD WITH FORCE FEEDBACK

BACKGROUND OF THE INVENTION

1. Field of the Invention

The present invention relates generally to the field of take-up frames and similar structures for maintaining desired force or alignment of rotating machinery. In particular, the invention relates to a system for providing feedback of forces exerted on a bearing set in a take-up frame, permitting a system or operator to regulate the force at the desired level.

2. Description of the Related Art

In rotating equipment, bearing assemblies are traditionally provided for securing a rotating element, typically a shaft, with respect to support or stationary components. By way of example, in conveyer belts, chain drives, and similar systems, active or passive shafts are supported on antifriction bearing assemblies for free rotation with a conveyor belt, chain assembly, or other transmission component. To maintain proper tension in these components, one end of the component is typically fixed in space such as on a driven pulley, while the opposite end is movable. The fixed end may be support on a pillow block or flanged bearing assembly, while structures such as take-up frames are employed at the movable end to provide for adjustment in tension of the transmission component.

Take-up frames include a framework supporting a movable bearing set. The framework may include glides, guiding rails, or similar confinement and alignment members which contact the bearing set to support it rigidly, while allowing its displacement within the frame. Special bearing sets may be employed, including housings adapted to receive a tension or compression adjustment member, such as a threaded rod, such as an acme type screw or the like. The threaded rod is, in turn, supported in the take-up frame, typically via a threaded nut. Adjustment in the position of the bearing assembly is made by turning the threaded rod or the nut to slide the bearing set into the desired location.

Take-up frames and bearing sets of the type described above are typically employed to maintain tensile or compressive forces within machine systems. Upon installation, the take-up frames are situated generally parallel to the forces to be regulated, such that adjustment of the bearing set position will tend to tighten or relax a machine component fitted around the associated rotated member. For belt conveyors and the like, take-up frames are often positioned on either side of an active or passive pulley. In other systems, such as chain drives, similar take-up frames may be positioned on one or both sides of an endless chain. Other applications exist in which compressive or tensile forces are maintained in more static (non-continuous or non-rotating) equipment. In such applications also, the take-up frame will be placed under compressive or tensile forces depending upon the orientation of the regulating element with respect to the forces applied.

Several drawbacks exist in conventional take-up frame structures. For example, forces exerted on take-up frames have commonly been judged by operator "feel," potentially leading to substantial variation in the actual forces applied to the systems, depending upon the operator experience and judgment. While certain operators may accurately judge loads during steady state operation, even these operators may fail to take into account excessive loading which can result during intermittent phases of operation. Where an inexperienced operator places too little load on the system, slack can occur, leading to accelerated component wear and eventual failure. Where excessive loading is placed on the structure, excessive heating can occur in the bearing, leading to its premature failure. Moreover, in systems employing take-up frames on either side of a rotating member, such as in conveyer systems, inconsistent loading on either side of the rotating component can lead to misalignment and tracking problems, as well as to uneven and excessive loading and failure of both the conveyer belt and the bearings. In summary, non-uniform or excessive loading of take-up frame supported systems may result in excessive bearing heating, pulley shaft deflection, bushing fatigue, and belt carcass damage, all potentially leading to costly downtime and maintenance.

There is a need, therefore, for an improved system for regulating loading of bearing sets in take-up frames. There is a particular need for a technique which can be used in connection with conventional take-up frame structures, permitting feedback of both tensile and compressive forces exerted on bearing sets by regulation of the take-up frame adjustment members.

SUMMARY OF THE INVENTION

The present invention provides a technique for regulating take-up frame forces designed to respond to these needs. The invention is particularly well suited to implementation in conventional sliding-type take-up frames, but may be adapted to accommodate other take-up frame styles. The technique may be used in systems in which the take-up frame is positioned either in tension or compression, providing feedback on forces exerted on the bearing sets in either case.

In accordance with aspects of the technique, a force transmitting member, such as a threaded rod is provided in the take-up frame, along with an adjustment member, such as a threaded nut coupled to the rod. By manipulation of the adjustment member, the position of a bearing set in the take-up frame is adjusted. A sensor assembly is coupled to the force transmitting member, such as directly in line between a threaded rod and a housing of the bearing set. Alternative positions of the sensor assembly may include a position adjacent to the adjustment member, adjacent to a backstop or end plate, and so forth. The sensor assembly is responsive to forces placed on the bearing set by the mechanical system. The sensor assembly produces an output signal representative of the force. A visual feedback is provided, such as via a resident module which may be formed as part of the sensor assembly or take-up frame package. The visual feedback may also be part of a non-resident module, such as a module which is electrically coupled to the sensor assembly only during adjustment of the take-up frame. When used on systems including two take-up frames on either side of a mechanical element, such as a belt pulley, the visual feedback may be used to adjust and balance take-up frame forces. Where desired, the system may be employed for remote access or monitoring of take-up frame forces, such as to detect periods in which adjustment may be required by system changes.

BRIEF DESCRIPTION OF THE DRAWINGS

The foregoing and other advantages of the invention will become apparent upon reading the following detailed description and upon reference to the drawings in which:

FIG. 1 is a top view of a portion of a conveyor system on which a take-up frame system is installed for maintaining appropriate tension and tracking, and for providing feedback in accordance with aspects of the present invention;

FIG. 2 is a side view of a portion of the take-up frame system of FIG. 1, illustrating a first embodiment for sensing and providing user-readable feedback of forces imposed on the take-up frame system;

FIG. 3 is a top view of a conveyor system similar to that shown in FIG. 1, but wherein take-up frame adjustment components are placed in compression and in which forces on the system are again sensed in accordance with the present technique for user-viewable feedback;

FIG. 4 is a side view of a portion of the take-up frame system of FIG. 3;

DETAILED DESCRIPTION OF SPECIFIC EMBODIMENTS

Figure 5:
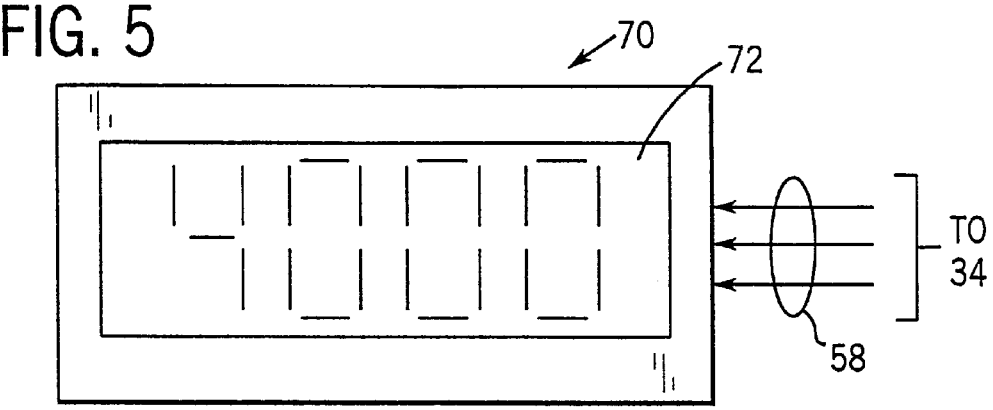
FIG. 5 is a plan view of an exemplary digital display for use in the power/readout circuitry in accordance with the present technique for determining appropriate or desired loading on a take-up frame system.

Turning now to the drawings, and referring first to FIG. 1, a take-up frame system, designated generally by reference numeral 10, is illustrated as applied to lateral sides of a belt conveyor. System 10 includes a shaft 12 supported on both ends by bearing sets 14. While both active (i.e. driven) and passive (i.e. idler) shafts may be employed with the take-up frame adjustment technique described herein, in a conveyor application, take-up frames will typically be applied to a passive shaft or pulley assembly at an end of a conveyor belt distal from a motor and drive arrangement. To maintain appropriate loading on bearings and on the conveyor belt, take-up frames 16 are provided, in which bearings 14 may be slidingly adjusted to position shaft 12 as desired.

Take-up frames 16 are mounted on any appropriate machine support 18, such as a stand or support framework. In the illustrated embodiment, a pulley 20 is fixed to shaft 12 and rotates therewith. A belt 22 is passed about pulley 20 and may be freely drawn by rotation of pulley 20 and shaft 12, as indicated by arrow 24. As will be appreciated by those skilled in the art, by appropriately adjusting take-up frames 16, thereby moving bearings 14 on either side of belt 22 into desired locations, the tension on belt 22 may be adjusted to a level appropriate for the anticipated loading, as well as to force proper tracking of belt 22 on pulley 20 and avoid lateral creep.

The present technique facilitates such adjustment by providing visual feedback to operations personnel. In particular, in the illustrated embodiment, each take-up frame 16 includes a framework 26 adapted to support a respective bearing set 14. While any suitable bearing set may be employed for this purpose, in the illustrated embodiment, a specially designed bearing housing 28 provides for sliding movement longitudinally within the framework 26. Alternative designs might include take-up frames adapted to support conventional flanged-type bearing housings, and so forth. The bearing housing is adapted to interface with a force transmitting member 30, such as a threaded rod. An adjustment member 32 is secured to the force transmitting member 30, and may include one or more threaded nuts, such as that illustrated in FIGS. 1 and 2. At an opposite end of force transmitting member 30, a sensor assembly 34 is provided for detecting loading on the bearing set. In the illustrated embodiment, sensor 34 is packaged in a coupling-type, or female threaded unit which may be directly threaded onto threaded rod 30, and, at an opposite end on a shorter threaded rod or interface member 36. Additional lock nuts (not shown) may be provided for maintaining the sensor assembly in the desired position on the force transmitting member 30 and the interface member 36.

Similarly instrumented take-up frames are provided on each side of the conveyor belt in the illustrated embodiment, as best shown in FIG. 1. When properly positioned and tensioned, bearing sets 14 will lie along a central rotational axis 38 of shaft 12, such that appropriate loading is placed on both the bearing sets and on the conveyor belt 22. Abnormal loading may result in angular displacement of the central rotational axis, as illustrated in a somewhat exaggerated example by line 40 in FIG. 1. While such angular displacement may be required to impose proper loading and tracking on the system, it may also result from improper adjustment of the take-up frame assemblies. It has been found that in heretofore known structures, without accurate feedback to operations personnel making such adjustments, substantial differences in lateral loading can occur. Similar loading errors may occur in other take-up frame systems employing a single adjustable take-up frame. Such loading errors can lead to accelerated wear on certain system components, such as a pulley or conveyor belt, as well as to excessive loading and consequent heating of the bearing set.

As best illustrated in FIG. 2, in the exemplary embodiment shown, each take-up frame 16 comprises a base frame structure 42 on which is fitted an access frame 44. The base and access frames comprise an assemblage of rigid frame elements, with the access frame 44 being supported pivotally on the base frame 42 via a pivot pin 46. Pivot pin 46 allows access frame 44 to be opened to gain access to bearing set 14 for assembly and servicing. A fastener 48 fits at an opposite end of access frame 44 to maintain the access frame rigidly secured to the base frame in the closed position shown. In the case of a sliding assembly such as that shown in the figures, upper and lower slides 50 are provided on base and access frames 42 and 44. Slides 50 interface with housing 28 of bearing set 14 to permit free sliding movement of the housing longitudinally within the assembled take-up frame, while constraining vertical and lateral movement of the housing. Base frame 42 terminates in an end plate or a similar structure 52 against which adjustment member 32 bears, and through which force transmitting member or threaded rod 30 extends.

The present technique may be used to provide feedback of force applied on the bearing assembly of a take-up frame either in a compressive mode or a tensile mode. In particular, in FIGS. 1 and 2, take-up frame 16 is employed in a tensile mode, wherein forces on conveyor belt 22 are resisted by tensile loading of rod 30, sensor assembly 34, and interface member 36. These imposed forces, represented by arrows 54 in FIG. 2, are thus opposed by relative tensile forces as indicated by arrow 56 in FIG. 2. This loading is detected by sensor 34 as described more fully below, and an indication of the force is provided to an operator either directly at the take-up frame location or at a remote location.

Sensor assembly 34 may comprise any suitable tension or compression transducer, capable of providing a signal representative of force applied to the sensor structure. In a presently preferred configuration, sensor assembly 34 includes a bridge arrangement configured to produce a 0–2.5 mV/V output signal with an excitation voltage of 2–12 VDC, the output signal being proportional to the force applied to the take-up frame force transmitting member or threaded rod 30. Sensor structures of this type are commercially available, for example, from GageTek of Rancho Cordova Calif., under the commercial designation Helix load cell.

Sensor assembly 34 is supplied with power, and outputs a feedback signal via an electrical link, as indicated generally at reference numeral 58. In the illustrated embodiment, power/readout circuitry 60 is coupled to the sensor assembly via the electrical link, and both supplies power for operation of the sensor assembly, as well as receives the output signals from the sensor assembly for display during adjustment. In general, the configuration of circuitry 60 will depend upon the power requirements of the sensor assembly. Such circuitry is readily available or configurable by those skilled in the art.

In a presently preferred configuration, the power/readout circuitry may be included in a hand-held readout module, or a resident module positioned at the take-up frame assembly. In the former case, operations personnel will simply complete a plug-in contact with the sensor assembly for adjustment of the take-up frame, reading out an indication of force applied to the take-up frame as discussed below. In the latter case, the circuitry may be switched on upon adjustment of the take-up frame assembly, and switched off following such adjustment.

As mentioned above, the present technique for adjustment of take-up frame force may be applied to both tensile and compressive applications. FIGS. 3 and 4 show an alternative configuration wherein compressive forces are sensed for adjustment of the take-up frame assembly. In the embodiment of FIGS. 3 and 4, a conveyor belt arrangement, similar to that shown in FIGS. 1 and 2, is assembled on a passive shaft 12 and pulley 20. Bearing sets 14 support the shaft for adjustment on take-up frames 16. However, rather than the tensile force transmitting member 30 of FIGS. 1 and 2, compressive members 62 are provided, also in the form of threaded rods. Nuts 64 provide for adjustment of the position of bearing sets 14 by abutment against an end plate 52 or a similar support surface. Thus, tensile forces on belt 22, indicated by arrows 66 in FIG. 4, are opposed by compressive forces on the take-up frame force transmitting and adjustment members, as indicated by arrow 68. Again, these forces are sensed by sensor assembly 34, producing a feedback signal indicative of the magnitude of such forces. The feedback signal is again transmitted via a link 58 to power/readout circuitry 60.

Figure 6:
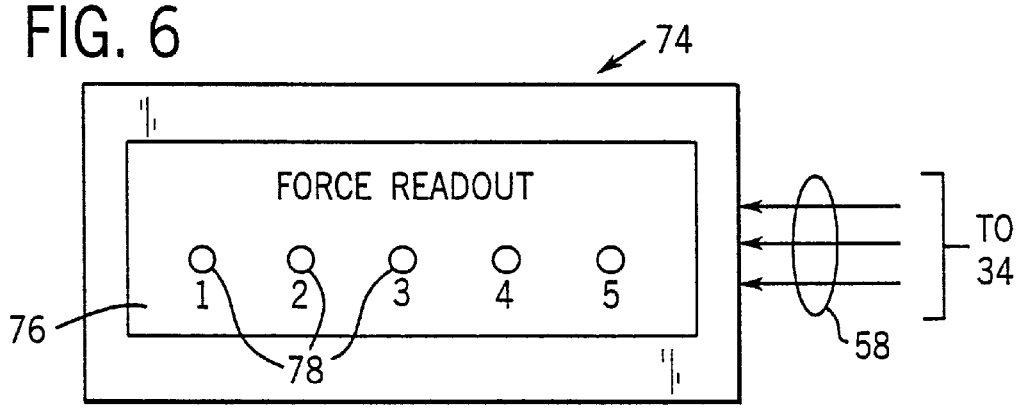
FIG. 6 is a similar view of a discrete level readout for use in take-up frame system adjustments.

Heretofore known arrangements for manual or automatic adjustment of take-up frame bearing sets have, at best, provided limited and indirect indications of bearing set position or loading. The present technique provides for a direct, quantitative readout of loading levels via circuitry 60. In particular, in presently preferred embodiments, the circuitry includes visual indications of the feedback signals provided by sensor assembly 34. FIGS. 5 and 6 illustrate exemplary configurations of such readout displays. As indicated above, these readout displays may be provided as a package with sensor assembly 34, remaining resident at the take-up frame, or may be a part of separate modules which can be interfaced with sensor assembly 34 only during periods of actual adjustment.

As shown in FIG. 5, a digital readout 70 may be provided for connection to the leads of link 58 extending from sensor assembly 34. A conventional LED or LCD readout 72 provides a direct correlation of the level of feedback signals from the sensor assembly to loading. As will be appreciated by those skilled in the art, circuitry 60 driving display 70 may be calibrated to provide a normalized or actual indication of loading in conventional units of measure (e.g. pounds of force). In an alternative configuration, illustrated in FIG. 6, a relative force readout 74 includes a display 76 comprised of a series of LEDs 78, with each successive LED being illuminated upon passing a threshold of force. For example, LEDs 1–5 may correspond to increments of hundreds of pounds of force applied to the take-up frame, either in compression or tension. Again, display 76 may be resident at the take-up frame, or may be part of a module interface with the sensor assembly only upon adjustment.

Figure 7:
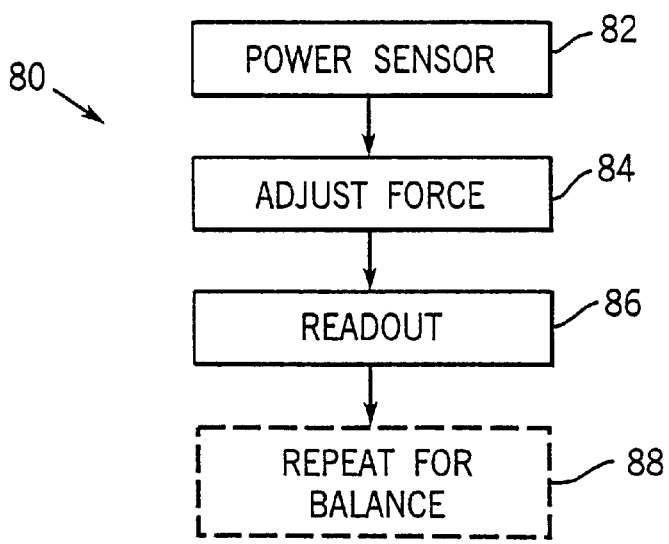
FIG. 7 is a simplified flow chart of exemplary control logic for adjustment and balancing of take-up frame systems in accordance with the present technique.

FIG. 7 is a simplified flow chart illustrating exemplary steps in the adjustment procedure, employing the foregoing structure, and in accordance with the present technique. The procedure, indicated generally by reference numeral 80, begins at step 82 wherein sensor assembly 34 is powered. Such power may be provided either by a remote source, such as through link 58 described above, or through a local battery source included in the sensor assembly. At step 84, the adjustment member 32 (see FIGS. 1 and 2) or 64 (see FIGS. 3 and 4) is adjusted to regulate the force applied to the take-up frame assembly. During such adjustment, the actual and direct readout of the force is observed on a display such as that shown in FIGS. 5 or 6. Adjustment continues until a desired level of force is obtained, as indicated on the visual display. This readout procedure is indicated at step 86 in FIG. 7.

For mechanical systems including a pair of take-up frame assemblies, such as that shown in the Figures, the power-up, adjustment and readout steps are repeated on both sides of the system, as indicated at step 88 in FIG. 7. As will be appreciated by those skilled in the art, system specifications will typically call for relative balance between the forces applied on the take-up frames, such that repetition of steps on one or both sides of the take-up frame may be required in the procedure.

When forces are obtained at their desired levels, and balance is obtained in multiple take-up frame systems, the adjustment procedure is completed, and the sensor assembly may be powered off where desired. An additional advantage of the present technique is the ability to verify forces on the take-up frames, either locally at the take-up frame, or remotely. Thus, the adjustment procedure 80 of FIG. 7 may be executed only upon indication that one or both of the take-up frames in a system are out of adjustment, either producing unacceptably low or unacceptably high levels of loading. It should be noted that such monitoring may be provided remotely, such as via a network link, and may be automated, such as via appropriate coding in a controller or similar circuit for comparing the current levels of loading to desired levels or tolerance windows.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims. For example, in the illustrated embodiment described above, a center pull take-up frame design is employed. Other take-up frame styles could, of course, be substituted for the center pull design. Where an offset from the centerline of the take-up fame results in a force angularly oriented from the take-up frame centerline, the sensor structure may conveniently compensate for such force systems. The sensor design mentioned above provides such compensation.

What is claimed is:

1. A bearing take-up frame assembly comprising:
   a take-up frame including a force transmitting member and an adjustment member secured to the force transmitting member;
   a bearing set coupled to the force transmitting member for movement by adjustment of the adjustment member;
   a sensor assembly coupled to the force transmitting member and configured to produce feedback signals representative of force applied to the force transmitting member; and
   a visual readout coupled to the sensor assembly for providing a visual indication of the force applied to the force transmitting member.

2. The assembly of claim 1, wherein the sensor assembly is secured between the force transmitting member and the bearing set.

3. The assembly of claim 1, wherein the force transmitting member includes a rod threaded into the sensor assembly.

4. The assembly of claim 3, wherein the sensor assembly is coupled to an interface member disposed between the sensor assembly and the bearing set.

5. The assembly of claim 1, wherein the visual readout is resident at the take-up frame.

6. The assembly of claim 1, wherein the visual readout includes a plurality of visual indicators activated upon attaining a corresponding plurality of threshold force levels on the sensor assembly.

7. The assembly of claim 1, wherein the visual readout includes a numerical display adapted to provide a quantitative readout of force applied to the sensor assembly.

8. The assembly of claim 1, wherein the force transmitting member and the sensor assembly are adapted for compressive or tensile loading.

9. A take-up frame system comprising:
   a machine system including a rotating component supported on first and second bearing sets;
   first and second take-up frames supporting the first and second bearing sets, respectively, each take-up frame including a force transmitting member and an adjustment member, the adjustable member being coupled to the force transmitting member for regulating force on the respective bearing set; and
   a force feedback system including a sensor linked to the force transmitting member of each take-up frame for generating feedback signals representative of forces applied to the respective force transmitting member, and a visual readout configured to provide a visual indication of the force based upon the feedback signals.

10. The system of claim 9, wherein each sensor of the force feedback system is coupled directly between a respective force transmitting member and a respective bearing set.

11. The system of claim 9, wherein the force transmitting member of each take-up frame is placed in tension during operation of the machine system, and each sensor provides a feedback signal representative of tensile force on the respective force transmitting member.

12. The system of claim 9, wherein each force transmitting member includes a threaded rod threadingly coupled to the adjustment member.

13. The system of claim 9, wherein the visual readout is separable from the sensors.

14. The system of claim 9, wherein the visual readout includes a plurality of visual indicators activated upon attaining a corresponding plurality of threshold force levels on the sensor assembly.

15. The system of claim 9, wherein the visual readout includes a numerical display adapted to provide a quantitative readout of force applied to the sensor assembly.

16. A method for regulating force on a take-up frame assembly of a mechanical system, the take-up frame assembly including a support frame, a bearing set supported by the support frame, a force transmitting member for transmitting force from the bearing set to the support frame, and an adjustment member coupled to the force transmitting member for adjusting force exerted on the bearing set, the method comprising the steps of:
   (a) sensing force exerted on the force transmitting member via a sensor assembly mechanically coupled to the force transmitting member, and generating a feedback signal representative thereof, and
   (b) providing a visual indication of the force exerted on the force transmitting member based upon the feedback signal.

17. The method of claim 16, comprising the further step of adjusting the force exerted on the force transmitting member by reference to the visual indication.

18. The method of claim 16, wherein the mechanical system includes two take-up frame assemblies for supporting a rotating member on sides thereof, and wherein the method includes repeating steps (a) and (b) on both take-up frame assemblies to balance forces applied by the force transmitting members on the machine system.

19. The method of claim 16, wherein the visual indication of the force is provided via a module resident at the take-up frame assembly.

20. The method of claim 16, wherein the sensor assembly is adapted to sense either tensile or compressive loading on the take-up frame assembly, and wherein step (b) includes providing a quantitative indication of the tensile or compressive loading on the sensor assembly.

* * * * *